(No Model.)
J. A. MULLEN.
FILTER.
No. 589,189. Patented Aug. 31, 1897.
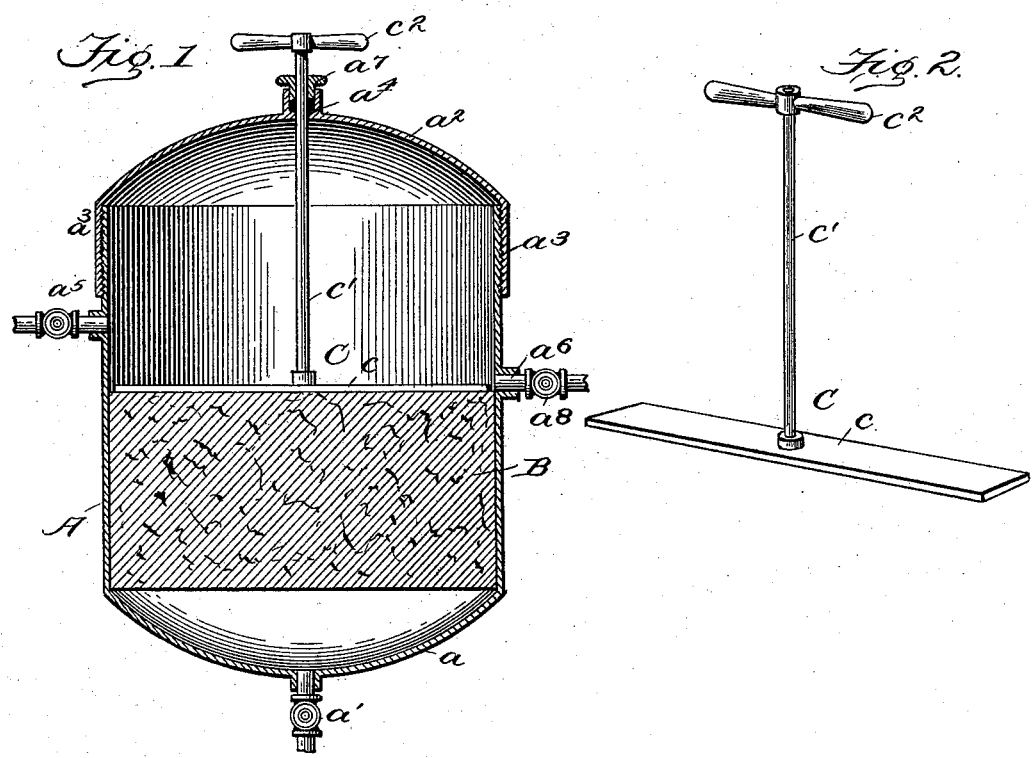
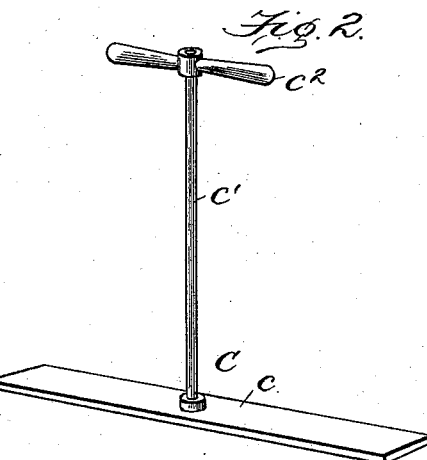
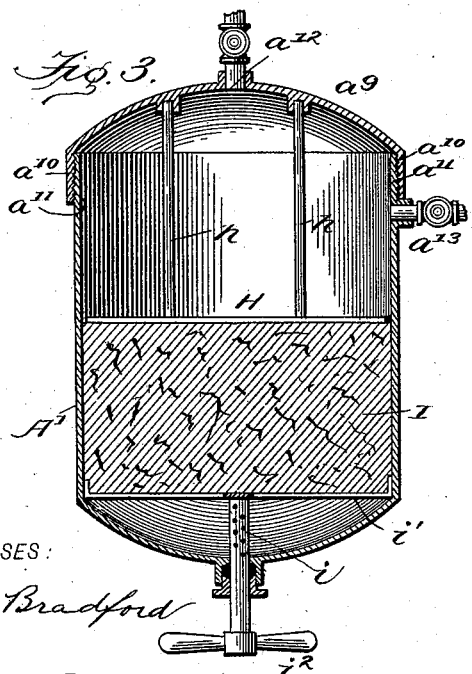
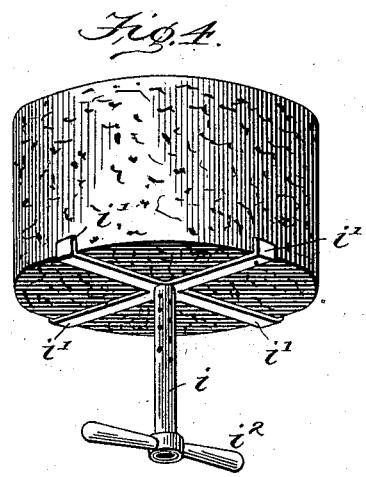
WITNESSES:
Edwin L. Bradford
Henry H. Byrne
INVENTOR,
James A. Mullen,
BY John Wedderburn
ATTORNEY.

UNITED STATES PATENT OFFICE.

JAMES A. MULLEN, OF NEW YORK, N. Y.

FILTER.

SPECIFICATION forming part of Letters Patent No. 589,189, dated August 31, 1897.

Application filed November 19, 1896. Serial No. 612,715. (No model.)

*To all whom it may concern:*

Be it known that I, JAMES A. MULLEN, a citizen of the United States, residing at New York, in the county of New York and State of New York, have invented certain new and useful Improvements in Filters; and I do hereby declare the following to be a full, clear, and exact description of the invention, such as will enable others skilled in the art to which it appertains to make and use the same.

This invention relates to improvements in filters, and has more particular relation to cleaning devices for the same.

The invention consists of certain novel constructions, combinations, and arrangements of parts, all of which will be hereinafter more fully described and claimed.

In the accompanying drawings, forming part of this specification, Figure 1 represents a central vertical section through a filter embodying my invention. Fig. 2 represents an enlarged detail perspective view of the cleaning-knife and its operating-shank. Fig. 3 represents a central vertical section through a modified form of my invention; and Fig. 4 represents an enlarged detail perspective view, taken from below, of the filtering-stone and its mounting embodied in this form.

A in the drawings represents the containing-casing, B the filtering-stone, and C the scraping-knife. Said casing A may be of any desired material and construction, but is preferably made, as shown in the drawings, with a conical bottom $a$, having an outlet $a'$ and a conical top or cover $a^2$, having a screw-threaded attaching-flange $a^3$ and an aperture $a^4$. The said casing A is also provided with an inlet $a^5$ and a sediment-outlet $a^6$. The porous stone or filterer B is applied in said casing A above the conical bottom $a$, with its upper surface just below the sediment-outlet $a^6$. The scraping-knife C comprises a single blade $c$, extending diametrically across the upper surface of said stone, and a vertical operating-shank $c'$, connected to said blade and extending up through a suitable packing $a^7$, mounted in the aperture $a^4$ in the cover $a^2$ of the casing. The upper end of said shank $c'$ is provided with an operating-handle or grip $c^2$, whereby said knife $c$ may be rotated over the upper surface of the filtering-stone and scrape all sediment and accumulations from the same, causing them to discharge through the outlet $a^6$. Said outlet $a^6$ is provided with a suitable cork or valve $a^8$, which is normally closed, so as to prevent the escape of the contents of the casing A.

It will be observed from the foregoing description that my improved filterer may be instantly cleaned by simply grasping the handle $c^2$, giving the same a slight rotation, and opening the valve $a^8$, thus permitting the accumulations that have been scraped from the upper surface of the filtering-stone to escape with the water in the casing A through the outlet $a^6$. A little fresh water introduced into the casing through the inlet $a^5$ will thoroughly wash out all the sediment and leave the interior of the filter, as well as the upper surface of the filtering-stone, clean and sweet. Said casing A may be supported in any desired position by any suitable supporting-base.

In the modified form of my invention shown in Figs. 3 and 4 the casing A' is substantially the same shape as the casing A, and is provided with a closing-cover $a^9$, secured to said casing by suitable screw-threads $a^{10}$ $a^{11}$, formed on said cover and said casing, respectively. The said cover $a^9$ is formed with an inlet $a^{12}$ and a sediment-outlet $a^{13}$, similar to the outlet $a^6$. The knife H is of practically the same construction as the knife $c$ and is mounted rigidly in position by a plurality of pendent arms $h$, connecting the same with the cover $a^9$. The filtering-stone I is rotatably mounted within said casing A' by a perforated pipe or tube $i$, that is connected to the bottom of said filtering-stone by a spider $i'$. The said tube $i$ passes through a suitable packing in the lower conical end of the casing A' and is provided at its lower end with an operating-handle $i^2$, by means of which said tube may be raised to raise the filtering-stone against the knife H, and thus clean said stone by rotating the same against said knife. The action in this case is the same as that heretofore described, with the exception that the knife is held stationary and the filtering-stone is rotated.

Having thus described my invention, what I claim as new, and desire to secure by Letters Patent, is—

1. In a filter, the combination with a suitable supporting-casing having an inlet and an outlet, of a filtering-stone mounted in said casing between said inlet and outlet, and a scraping-knife mounted in said casing so as to extend entirely across the diameter of one end of the stone to scrape the same, and a sediment-outlet connected to said casing above the filtering-stone, substantially as described.

2. In a filter, the combination with a suitable casing having an inlet at its upper end, of a knife rigidly mounted in said casing, a filtering-stone, a tube supporting said stone and extending through the bottom of said casing, and a handle mounted on said tube for rotating the same to cause the filtering-stone to engage the under side of the knife, and scrape the sediment therefrom, and means for withdrawing said sediment from above the stone, substantially as described.

3. In a filter, the combination with a suitable casing, of a closing-top secured to the same, a scraping-knife pendent from said top and extending across the entire diameter of said casing, a movable filtering-stone mounted in said casing, a perforated tube supporting said stone and extending through a suitable packing in the bottom of the casing, and a handle mounted on the lower end of said tube for rotating the same to cause a movement of the stone and the scraping-knife to scrape the sediment therefrom, substantially as described.

In testimony whereof I have signed this specification in the presence of two subscribing witnesses.

JAMES A. MULLEN.

Witnesses:
BENJ. F. CRUMP,
FRANCIS LYNCH.